Aug. 1, 1961
C. H. FLUBACKER
2,994,757
APPARATUS FOR PREVENTING OPERATION OF
DEICING EQUIPMENT BY A FALSE SIGNAL
Filed Oct. 9, 1957
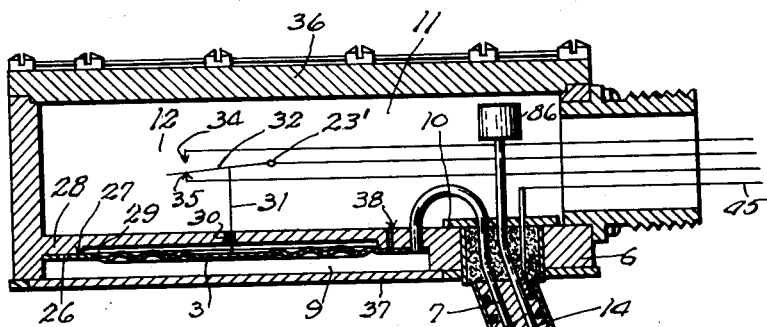
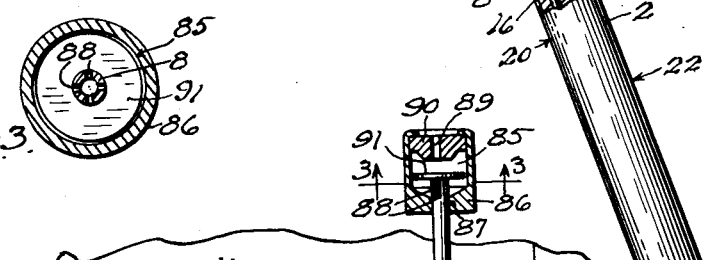
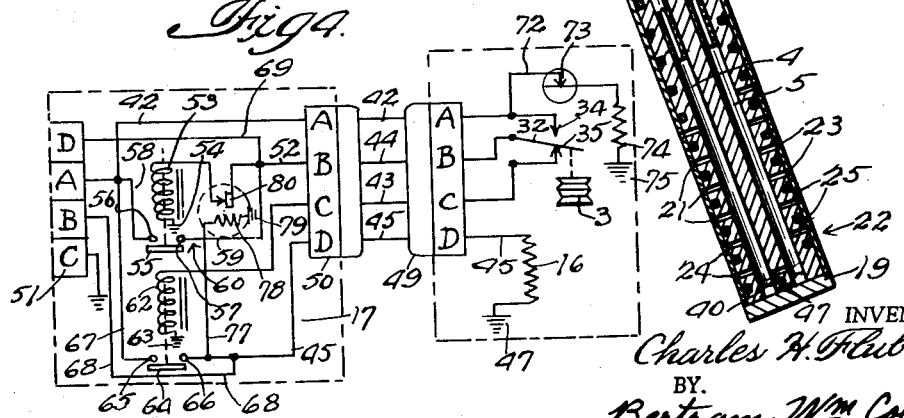
INVENTOR.
Charles H. Flubacker.
BY.
Bertram Wm Coltman United States Patent Office 2,994,757
Patented Aug. 1, 1961

2,994,757
APPARATUS FOR PREVENTING OPERATION OF DEICING EQUIPMENT BY A FALSE SIGNAL
Charles H. Flubacker, Wauconda, Ill., assignor to Cook Electric Company, Chicago, Ill., a corporation of Delaware
Filed Oct. 9, 1957, Ser. No. 689,130
16 Claims. (Cl. 219—19)

This invention relates to an ice detecting system, and more particularly to a system and apparatus for detecting the formation of ice upon moving vehicles such as airplanes or the like.

The invention is directed to such a system or apparatus, and more particularly, although not limited thereto, to the system and apparatus disclosed in United States Letters Patents Numbers 2,775,678, 2,775,679 and 2,775,-680, granted December 25, 1956, to applicant and assigned to the present assignee.

The invention in one of its more specific aspects resides in the use of a probe or the like wherein an impact pressure proportional to the air velocity is created and vented to the diaphragm of a differential pressure switch. The formation of the ice on the probe causes failure of the impact pressure and immediate operation of the pressure switch whereby a signal is created and a heating circuit is operated to clear the ice from the probe.

In one form of the probe, a greater perforated area may be provided along its leading edge than along its trailing edge and a flexible diaphragm provided to actuate a pressure switch either as the result of impact pressure or as the result of no air flow so that this condition at the leading edge may be utilized to determine the operation of the deicing apparatus for the vehicle. Whether or not a greater perforated area is used along the leading edge, it has been found in actual operation that the back surges of the compressor resulting from an increase in throttling settings on jet engine aircraft during takeoff or during inflight maneuvering can momentarily cause an impact pressure or back surge of air along the trailing edge, and hence, create a condition similar to no air flow or a lower pressure along the leading edge. This will immediately act to energize the heating circuit of the probe and to operate the deicing apparatus on the vehicle with a consequent loss of power at a time when power is most needed. This creation of a false icing condition is highly undesirable at the time of takeoff or flight maneuvering.

It is an object of the present invention to provide means for preventing the back surges of the compressor in jet engine aircraft during takeoff or maneuvering of any kind from creating a false icing condition that will cause energization of the deicing equipment and an unnecessary consumption of power at a time when power is most needed.

It is a further object of the invention to provide an improved form of structure capable of preventing a back pressure of any duration from affecting the operation of the ice detecting system disclosed and claimed in the aforesaid patents so as to create a false condition and the operation of the equipment when an icing condition does not in fact exist and deicing is not necessary.

In one of its more specific forms, the present invention provides means for momentarily closing off the passage leading from the trailing edge of a probe to the pressure chamber so that the abnormal pressure condition created by the back surges of the compressor will not reach the pressure chamber and affect the operation of the deicing equipment. This means may be in the form of a simple pop-up valve disposed in such a manner that it normally will leave the passage open and will close the same upon the occurrence of an increase of pressure along the trailing edge created by the back surges of the compressor on takeoff or during maneuvering of jet aircraft. Consumption of power at a critical time will thus be prevented.

Other objects and advantages of the invention will be apparent from the following detailed description when taken in connection with the accompanying drawing which forms a part hereof.

In the drawing:

FIGURE 1 is a vertical transverse section of the upper portion of the probe and its mounting, including the differential pressure switch adapted to operate the heating circuit of the probe and the deicing equipment of the airship;

FIG. 2 is an enlarged transverse section of the probe and its mounting, a portion of the pressure chamber, and the mounting of a close-off valve for the passage of the probe connecting to the trailing edge;

FIG. 3 is a sectional view taken along line 3—3 of FIG. 2; and

FIG. 4 is a wiring diagram of the unit.

The apparatus disclosed herein comprises a probe 2 and a flexible wall 3 in the form of a diaphragm adapted to respond to pressure changes in passages 4 and 5 forming a part of this probe 2. Probe 2 is preferably attached to a housing 6 and passages 4 and 5 continue into this housing in the form of tubes 7 and 8 which are anchored, as shown, in passages 4 and 5 and which extend upwardly, the tube 7 bending upwardly and downwardly to communicate with a pressure chamber 9 and the tube 8 extending up through wall 10 into a compartment 11 in which a switch 12 is disposed.

Probe 2 includes a rod 14 having a spiral groove 15 cut therein to receive wire 16 of the heating circuit designated broadly as 17. A sleeve 18 of relatively thin wall structure is adapted to enclose rod 14 and uniquely keep heating wire 16 securely disposed within its groove 15. Passages 4 and 5 extend to the outer tip of rod 14, but they are sealed at this tip by a closure disk 19 suitably secured in sealed relation to the end of rod 14 and sleeve 18. Lead edge 20 is provided with a plurality of perforations 21 while trailing edge 22 is provided with a plurality of perforations 23. Perforations 21 and 23 are formed by cutting a plurality of transverse passages 24 and 25 inwardly to communicate with passages 4 and 5.

Diaphragm 3 is suitably sealed at its periphery 26 to surface 27 of wall 28. Surface 27 comprises the face of a raised annular shoulder 29. Wall 28 is provided with a central opening 30 through which extends a pin or rod 31 secured at one end to a diaphragm 3 and at the other end to a movable switch arm 32 suitably pivoted, say, at 23', it being understood that this particular construction may vary according to the requirements of a particular installation. Switch arm 32 is adapted to swing back and forth to engage either contact 34 or 35, this depending upon the position of diaphragm 3. Compartment 11 is closed off by a cover 36 suitably secured to housing 6. Chamber 9 may be closed off by a plate 37, likewise secured to housing 6. A small bleed passage 38 is provided in wall 28 to place chamber 9 in communication with compartment 11 so that the pressures in chamber 9 and compartment 11 will equalize when impact pressure at apertures 21 fails. A smaller bleed passage 40 is provided near the tip of rod 14 between passages 4 and 5. It will be noted that this impact pressure occurring in passage 4 will increase the pressure in chamber 9 and flex diaphragm 3 upwardly to swing switch blade 32 into engagement with contact 34. As long as this impact pressure continues, switch blade 32 will remain in engagement with contact 34. However, if ice forms on the leading edge 20 of probe 2, which ice formation will cover apertures 21 of passages 24, the impact pressure will cease or fail and the pressure between chamber 9 and compartment 11 will equalize so as to allow diaphragm 3 to return to its normal position and move switch blade 32 into engagement with contact 35.

In the wiring diagram illustrated in FIG. 4, diaphragm 3 is diagrammatically shown as a flexible chamber that operates switch blade 32 between contacts 34 and 35. Wires 42 and 43 connect to contacts 34 and 35 respectively, while wire 44 connects to switch blade 32. Heater wire 45 connects to heater 16 which is illustrated as grounded at 47, this being shown also in FIG. 1 at a point where heater wire 16 is anchored crosswise in rod 14, at the bottom thereof, in order to establish firm grounded contact.

Wires 42–45, inclusive, may lead out of a properly marked terminal block like that shown at 49. These wires then lead to a second terminal block or plug 50, both carrying preferably the same individual wiring designations so that no error will be made in making the connections.

Wire 42 leads to a source of current supply designated as A on terminal block 51. This wire 42, together with wire 44 constitutes an arming circuit 52 which includes a relay 53 grounded at 54. When switch blade 32 is moved to engage contact 34, the circuit is completed from a source of current supply A through wire 42 of the arming circuit 52, contact 34, switch blade 32, wire 44 and the coil of relay 53 to ground 54. Immediately, relay 53 is energized and switch 55 is closed at contacts 56 and 57. Contact 56 is connected by wire 58 to wire 42 leading to the source of current supply A. Contact 57 is connected by wire 59 to wire 52 connecting to relay 53. Wires 58 and 59 together with switch 55 and its contacts 56 and 57 constitute a holding circuit designated broadly as 60 to lock the arming circuit closed when switch blade 32 is raised to engage contact 34. Thus switch blade 32 is energized when impact pressure occurs in passage 4 of probe 2 and chamber 9 of pressure switch 12.

No further action occurs while impact pressure exists in probe 2 and chamber 9. However, if this impact pressure fails by reason of the fact that ice forms on the leading edge 20, switch blade 32 will drop to engage contact 35 as illustrated in FIG. 1. This immediately energizes a circuit which includes wire 43 and a second relay 62 grounded at 63. Actuation of relay 62 closes switch 64 at contacts 65 and 66. Switch 64 and its contacts 65 and 66 are preferably in heating circuit 17 which includes wire 45 and heating coil 16 grounded at 47. A wire 67 connects contact 65 to wire 42 and source of current supply A. A deicing circuit for the aircraft, including a signal lamp or audible signal, is designated broadly as B connected to the heating circuit by wire 68 so that the deicing equipment of the aircraft will be immediately energized when heating circuit 17 is energized. A wire 69 connected to wire 44 may lead to an arming light D adapted to indicate when arming circuit 52 is closed and switch arm 32 of differential pressure switch 12 is energized.

If it is desirable to maintain a predetermined temperature at housing 6, a wire 72 may connect to wire 42 that connects directly to the source of current supply A and then to a thermostat 73. Thermostat 73 may then be connected to an auxiliary heating coil 74 grounded at 75.

From the foregoing description, it will be apparent that impact pressure at apertures 21 of leading edge 20 of probe 2 will impose a pressure on the underside of diaphragm 3 in excess of the pressure in compartment 11 which communicates through hole 30 with the opposite side of diaphragm 3. This impact pressure will flex diaphragm 3 upwardly and swing contact arm 32 into engagement with contact 34. This immediately establishes a circuit from source A, wire 42, contact 34, switch arm 32, wire 44 of arming circuit 52, relay 53 and to ground at 54. When arming circuit 52 is thus closed, switch 55 is closed through actuation of relay 53. Current will then flow from source A through wire 58, contact 56, switch 55, contact 57, wire 59 and return to ground 54 of relay 53. The circuit constitutes a holding circuit to keep relay 53 energized and, consequently, the arming circuit 52. At this time, current will also flow from wire 59 through wire 69 to arming light D thereby indicating to the pilot that arming circuit 52 is closed. This condition continues as long as impact pressure is imposed upon apertures 21 and diaphragm 3, this being, of course, a condition that will prevail while the airplane is in flight and the motors are operating at, say, a speed in excess of 47 miles per hour. If climatic conditions are conducive to ice formation during flight of the airplane, ice will form upon leading edge 20 of probe 2. This ice formation will block apertures 21 and the pressure existing at the time in passage 4 and chamber 9 will equalize with pressure in compartment 11 by reason of bleed passages 38 and 40. This equalization of pressure returns diaphragm 3 to its original position and brings switch arm 32 into engagement with contact 35. This is the result of arming circuit 52 remaining energized by efforts of holding circuit 60 which includes switch 64. Current will then flow from the source A through the holding circuit to wire 44 of arming circuit 52, through switch arm 32, contact 35, wire 43 to the second relay 62 and back to ground 63. Relay 62 will be immediately energized to cause switch 64 to close the contacts 65 and 66. The current will then flow from the source of supply A through wire 67, switch 64, wire 45, heating wire 16 of probe 2 and to ground 47. Heater 16 is of substantial capacity, preferably in the neighborhood of 200 watts or so, in order to effect melting of ice formation on the surface of probe 2 within a short period, said for example, of five seconds or so. This immediately restores impact pressure in apertures 21 and their passages 4 and chamber 9. Promptly, diaphragm 3 operates switch arm 32 to a position engaging contact 34. Arming circuit 52 is still energized and remains energized as well as switch arm 32 which engages contact 34. However, the heating circuit 17 is open when switch arm 32 engages contact of switch 12. This is the result of relay 62 being de-energized and switch 64 being opened at contacts 65 and 66 to open heating circuit 17.

Frequently, an aircraft is compelled to land and remain parked for substantial periods with the various services such as lights, ventilation and other vital controls in operation, thus requiring the master switch to remain in closed position. The present system should, like all other controls, remain connected to the master switch so that the system will be capable of functioning as soon as the aircraft is in flight without requiring the attention of the pilot. This is a matter of safety to prevent possibility of the ship being in flight without the system being in operation through the failure of the pilot to close a separate control. However, when the aircraft is parked, impact pressure will also fail at apertures 21. Pressures on opposite sides of diaphragm 3 will immediately equalize through passages 38 and 40 so that switch 12 will be operated by diaphragm 3 to move switch blade 32 to a position engaging contact 35. With heater 16 of 200 watts or so continuously closed during the parking period, it is quite obvious that this heater will burn out and undoubtedly create additional damage.

To assure that the heater coil 16 will not burn out and be in condition for subsequent functioning when the aircraft is again in flight, current flowing through wire 77 connected to wire 45 of heating circuit 17 will flow through a resistance winding 78 that is grounded at its opposite end at 79. A thermally-controlled switch 80 is then subjected to the heating effects of the current flowing through wire 45 of heating circuit 17. Thermally-controlled switch 80 may be set to open at a predetermined temperature which may be set with a time delay of from ten to fifteen seconds after the current first flows through resistance winding 78. This period may vary according to the requirements of the installation, but it is obvious that it will be in excess of the normal operation that opens and closes the heating circuit 17 to melt the ice formation on the surfaces of probe 2. The opening of the thermally-operated switch 80 will open arming circuit 52 as well as holding circuit 60 and will immediately de-energize relay 53. De-energizing relay 53 will open switch 55 of holding circuit 60. Thus the heating circuit 17 is immediately broken because switch arm 32 of switch 12 is de-energized when arming circuit 52 is opened. This discontinues the current flow through relay 62, thus opening switch 64 of heating circuit 17. Switch arm 32 will remain engaged with contact 35 as long as failure of impact pressure continues by reason of the fact that the aircraft is not in motion. The entire ice detecting system is thereby effectively disconnected from the master switch and the heating coil protected from destruction regardless of the period the airplane remains parked. However, movement of the airplane will again restore impact pressure at apertures 21 and promptly again cause diaphragm 3 to actuate switch arm 32 into engagement with contact 34. Arming circuit 52 is then energized and the operating condition of the entire system restored for prompt deicing through the heating circuit 17 of any ice formation on the surface of probe 2 as the ship is again put into flight.

It has been found that when the present system is installed on certain types of aircraft, such as those operated by jet engines, a false icing condition can be created to cause energization of the deicing system and unnecessary loss of power. For example, in jet engine aircraft, the increasing of the throttle during takeoff and inflight maneuvering causes the compressor to create back surges of air that will strike trailing edge 22 and create an increase in pressure in passage 5 and compartment 11. This increase of pressure in compartment 11, acting through central opening 30, will deflect diaphragm 3 downwardly and move switch arm 32 into engagement with contact 35. As previously explained, movement of switch arm 32 into engagement with contact 35 immediately energizes heating circuit 17 and the heating coil 16 of probe 2. It will also actuate the deicing equipment of the aircraft. This abnormal pressure condition in passage 5 and compartment 11 can and does occur at times when full power is most needed. In certain installations, the closing of the heating circuit 17 to deice probe 2 and the energization of the deicing equipment of the aircraft itself will cause as much as a 5% loss in power. This is particularly serious because this inflight maneuvering includes battle engagements where maximum power should always be available.

To solve this problem, tube 8 is conducted upwardly into compartment 11 to terminate within a chamber 85 provided in a housing 86. Housing 86 can be arranged to be carried by tube 8 at its upper end through proper clamping of the same along the surface 87. Tube 8 is provided in this upper end with a plurality of longitudinal slots 88 that connect the inner passage of tube 8 with chamber 85 at all times. Consequently, during normal operation, passage 5 is in communication with compartment 11 through an opening 89 in a cap 90 carried by housing 86. It will be observed that the tip of tube 8 provided with the longitudinal slots 88 extends a short distance upwardly into chamber 85, the bottom of this chamber being preferably tapered downwardly to the bottom edge of slots 88 so as to provide maximum communication between these slots 88 and chamber 85. Resting upon the upper end of tube 8 is a floating valve 91 that normally will remain seated in the manner illustrated in FIG. 2. However, at the moment back surges of air from the compressor create abnormally high pressure in passage 5 so as to cause diaphragm 3 to flex downwardly and move switch blade 32 into engagement with contact 35, valve 91 will pop upwardly and close passage 89 so as to close communication between passage 5 and compartment 11. This will prevent the downward deflection of diaphragm 3 and the movement of contact arm 32 from contact 34 to contact 35.

As soon as this excessive pressure is relieved in passage 5, valve 91 will drop to its seat upon the upper end of tube 8. This will immediately restore communication between passage 5 and compartment 11 and restore the normal functioning of the system to allow impact pressure against the lead edge 20 to hold contact arm 32 in engagement with contact 34 to thus keep the arming circuit 52 energized.

It will be observed that the extremely simple structure provided will effectively prevent an abnormally high pressure condition along the trailing edge 22 from causing a false deicing operation that will energize not only the deicing circuit of probe 2 but also the deicing equipment of the aircraft, thus unnecessarily consuming power at a vital time, either during takeoff or inflight maneuvering when maximum power is required for flight operations.

Without further elaboration, the foregoing will so fully explain the character of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. Apparatus for detecting the formation of ice upon a travelling vehicle or the like and for energizing the deicing equipment carried by said vehicle to remove the ice after it forms or as it tends to form, comprising a pressure chamber, a diaphragm disposed therein, a switch adapted to be operated by the movement of said diaphragm, and a probe exposed to the air flow past the vehicle, said probe having a leading edge and a trailing edge and a longitudinal passage therein for each edge, each passage having means placing the passage in communication with its respective edge, means connecting said passages with opposite sides of said diaphragm, said diaphragm operating said switch by an impact pressure against said leading edge, and means for preventing the operation of said switch by an impact pressure against said trailing edge.

2. Apparatus for detecting and removing the formation of ice upon a travelling vehicle or the like, comprising a probe having a leading edge and a trailing edge, said probe being exposed to the air flow past the vehicle and to the ice that may form upon the vehicle, deicing means, a pressure-actuated device, means connecting said probe to said pressure-actuated device to actuate said deicing means upon formation of ice upon said probe, and means for preventing an impact pressure or back surge of air against said trailing edge of said probe from actuating said pressure-actuated device.

3. Apparatus for detecting and removing the formation of ice upon a travelling vehicle or the like, comprising a probe having a leading edge and a trailing edge, said probe being exposed to the air flow past said vehicle and to the ice that may form upon the vehicle, deicing means, means connected to said probe for operating said deicing means upon the formation of ice upon said probe and means for preventing an impact pressure or back surge of air against said trailing edge of said probe from causing said connected means to actuate said deicing means.

4. Apparatus for detecting and removing the formation of ice upon a travelling vehicle or the like, comprising a probe having a leading edge and a trailing edge, said probe being exposed to the air flow past said vehicle and to the ice that may form upon said vehicle, said probe having a passage therein connecting to said leading edge and a passage therein connecting to said trailing edge, a pressure chamber, a pressure-responsive member in said chamber, means connected with said pressure-responsive member for actuating said deicing means, said passages connecting to opposite sides of said pressure member, and means for preventing a predetermined pressure condition against the trailing edge of said probe from causing said pressure-responsive member to actuate said deicing means.

5. Apparatus for detecting and removing the formation of ice upon a travelling vehicle or the like, comprising a probe having a leading edge and a trailing edge, said probe being exposed to the air flow past said vehicle, a plurality of passages in said probe subject to pressure conditions along said leading and trailing edges, a chamber with which said passages communicate, a movable member in said chamber, deicing means adapted to be operated by said movable member by a predetermined pressure condition exteriorly of said probe along one of its said edges, and means for preventing a second predetermined pressure condition along the other of said edges from causing the operation of said deicing means.

6. Apparatus for detecting and removing the formation of ice upon a travelling vehicle or the like, comprising a probe having a leading edge and a trailing edge, said probe being exposed to the air flow past said vehicle, a plurality of passages in said probe subject to pressure conditions along said leading and trailing edges, a chamber with which said passages communicate, a movable member in said chamber, deicing means adapted to be operated by said movable member, said passages so communicating with said chamber on opposite sides respectively of said movable member as to cause a predetermined pressure condition along one of said edges to operate said movable member and actuate said deicing means, and means for preventing a second predetermined pressure condition along the other of said edges from causing said movable member to actuate said deicing means.

7. Apparatus for detecting and removing the formation of ice upon a travelling vehicle or the like, comprising a probe having a leading edge and a trailing edge, said probe being exposed to the air flow past said vehicle, a plurality of passages in said probe subject to pressure conditions along said leading and trailing edges, a chamber with which said passages communicate, a movable member in said chamber, deicing means adapted to be operated by said movable member, said passages so communicating with said chamber on opposite sides respectively of said movable member as to cause an impact pressure along said leading edge to hold said movable member in a position to keep said deicing means de-energized and to cause an impact pressure along said trailing edge to hold said movable member in a position to energize said deicing means, and means to prevent said deicing means being energized when an impact pressure occurs along said trailing edge.

8. Apparatus for detecting and removing the formation of ice upon a travelling vehicle or the like comprising a probe having a leading edge and a trailing edge, said probe being exposed to the air flow past said vehicle, a plurality of passages in said probe subject to pressure conditions along said leading and trailing edges, a chamber with which said passages communicate, a movable member in said chamber, deicing means adapted to be operated by said movable member, said passages so communicating with said chamber on opposite sides respectively of said movable member as to cause an impact pressure along said leading edge to hold said movable member in a position to keep said deicing means de-energized and to cause an impact pressure along said trailing edge to hold said movable member in a position to energize said deicing means, and means to close off communication between said chamber and said passage subject to the pressure conditions along said trailing edge when a predetermined pressure condition occurs along said trailing edge.

9. Apparatus for detecting and removing the formation of ice upon a travelling vehicle or the like, comprising a probe having a leading edge and a trailing edge, said probe being exposed to the air flow past said vehicle, a plurality of passages in said probe subject to pressure conditions along said leading and trailing edges, a chamber with which said passages communicate, a movable member in said chamber, deicing means adapted to be operated by said movable member, said passages so communicating with said chamber on opposite sides respectively of said movable member as to cause the latter to de-energize said deicing means upon occurrence of an impact pressure along said leading edge and to energize said deicing means upon the failure of said impact pressure along said leading edge, and to keep said deicing means de-energized upon occurrence of an impact pressure or back surge of air against said trailing edge.

10. Apparatus for detecting and removing the formation of ice upon a travelling vehicle or the like, comprising a probe having a leading edge and a trailing edge, said probe being exposed to the air flow past said vehicle, a plurality of passages in said probe subject to pressure conditions along said leading and trailing edges, a chamber with which said passages communicate, a movable member in said chamber, deicing means adapted to be operated by said movable member, said passages so communicating with said chamber on opposite sides respectively of said movable member as to cause the latter to de-energize said deicing means upon occurrence of an impact pressure along said leading edge and to energize said deicing means upon the failure of said impact pressure along said leading edge, and valve means to prevent said movable means energizing said deicing means when an impact pressure or back surge of air occurs against said trailing edge.

11. Apparatus for detecting and removing the formation of ice upon a travelling vehicle or the like, comprising a probe having a leading edge and a trailing edge, said probe being exposed to the air flow past said vehicle, a plurality of passages in said probe subject to pressure conditions along said leading and trailing edges, a chamber with which said passages communicate, a movable member in said chamber, deicing means adapted to be operated by said movable member by predetermined pressure conditions along said leading edge, an impact pressure along said leading edge holding said deicing means de-energized and the failure of an impact pressure energizing said deicing means, and means preventing a predetermined pressure condition along said trailing edge from energizing said deicing means.

12. Apparatus for detecting and removing the formation of ice upon a travelling vehicle or the like, comprising a probe having a leading edge and a trailing edge, said probe being exposed to the air flow past said vehicle, a plurality of passages in said probe, means subjecting said passages to pressure conditions along said leading and trailing edges, a chamber with which said passages communicate, a movable member in said chamber, deicing means adapted to be operated by said movable member by predetermined pressure conditions along said leading edge, an impact pressure along said leading edge holding said deicing means de-energized and the failure of an impact pressure energizing said deicing means, and a valve means closing the passage subject to pressure conditions along said trailing edge upon the occurrence of an impact pressure or back surge against said trailing edge.

13. Apparatus for detecting and removing the formation of ice upon a travelling vehicle or the like, comprising a probe having a leading edge and a trailing edge, said probe being exposed to the air flow past said vehicle, a plurality of passages in said probe, means subjecting said passages to pressure conditions along said leading and trailing edges, a chamber with which said passages communicate, a movable member in said chamber, deicing means adapted to be operated by said movable member, the passage subject to pressure conditions along said leading edge communicating with said chamber on one side of said movable member, the other passage subject to pressure conditions along said trailing edge communicating with said chamber on the opposite side of said movable member, and a valve for the latter passage adapted to close off said passage upon the occurrence of a back surge of pressure against said trailing edge.

14. Apparatus for detecting and removing the formation of ice upon a travelling vehicle or the like, comprising a probe having a leading edge and a trailing edge, said probe being exposed to the air flow past said vehicle, a plurality of passages in said probe, means subjecting said passages to pressure conditions along said leading and trailing edges, a chamber with which said passages communicate, a movable member in said chamber, deicing means adapted to be operated by said movable member, the passage subject to pressure conditions along said leading edge communicating with said chamber on one side of said movable member, the other passage subject to pressure conditions along said trailing edge communicating with said chamber on the opposite side of said movable member, and means to prevent a back surge of pressure against said trailing edge from reaching said chamber through said other passage.

15. Apparatus for detecting the formation of ice upon a moving vehicle or the like, comprising a probe having a leading edge, said probe being adapted to be exposed to the air flow past said vehicle and to the ice that may form on said vehicle, a first passage in said probe and extending to said leading edge for receiving the impact pressure due to said air flow, a second passage for receiving static pressure, a pressure actuated deicing control device connected between said passages and responsive to the difference between said impact pressure and said static pressure, the icing of said first passage being effective to block off said impact pressure and cause said control device to generate a deicing signal, and valve means for preventing reverse flow of air in said second passage so as to isolate said control device from any surge of air into said second passage.

16. Apparatus for detecting the formation of ice upon a moving vehicle or the like, comprising a probe having a leading edge, said probe being adapted to be exposed to the air flow past said vehicle and to the ice that may form on said vehicle, a first passage in said probe and extending to said leading edge for receiving the impact pressure due to said air flow, a second passage for receiving static pressure, a pressure actuated deicing control device connected between said passages and responsive to the difference between said impact pressure and said static pressure, the icing of said first passage being effective to block off said impact pressure and cause said control device to generate a deicing signal, and valve means for checking any reverse surge of air into said second passage and thereby preventing a false deicing signal.

References Cited in the file of this patent
UNITED STATES PATENTS

| | | |
|---|---|---|
| 2,338,574 | Cunningham | Jan. 4, 1944 |
| 2,493,931 | Smaby | Jan. 10, 1950 |
| 2,711,453 | Leigh | June 21, 1955 |
| 2,744,992 | Spears | May 8, 1956 |
| 2,775,679 | Flubacker | Dec. 25, 1956 |
| 2,874,259 | Morris | Feb. 17, 1959 |